April 5, 1960

C. I. JONES 2,931,867

TIRE DEFLATION SIGNAL

Filed Sept. 30, 1958

Cecil I. Jones
INVENTOR.

BY
Attorneys

April 5, 1960
C. I. JONES
2,931,867
TIRE DEFLATION SIGNAL
Filed Sept. 30, 1958
2 Sheets-Sheet 2
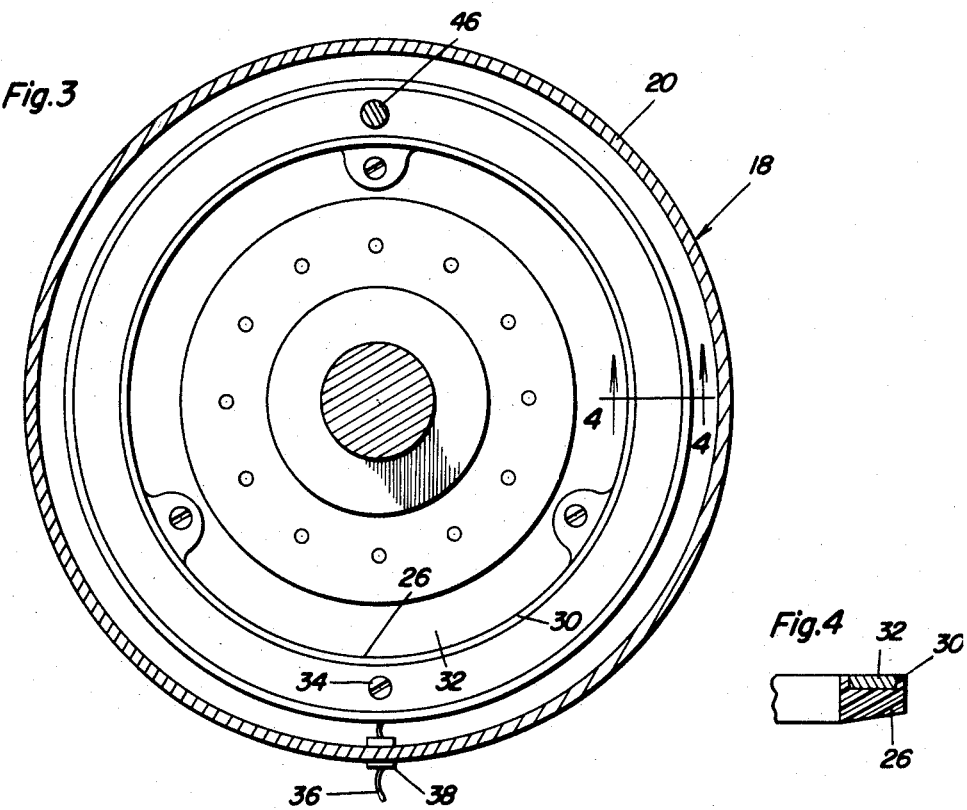
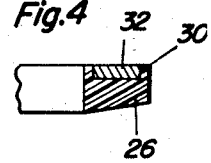
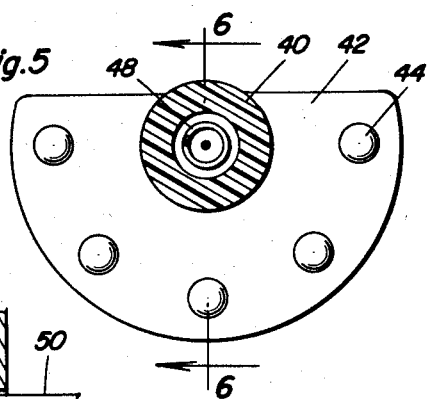
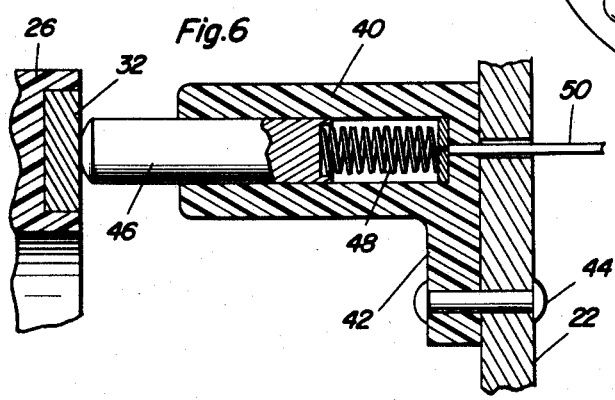
Cecil I. Jones
    INVENTOR.
BY *Clarence A. O'Brien*
*and Harvey B. Jacobson*
Attorneys

United States Patent Office 2,931,867
Patented Apr. 5, 1960

2,931,867
TIRE DEFLATION SIGNAL
Cecil I. Jones, Blue Ridge, Alberta, Canada Application September 30, 1958, Serial No. 764,280

2 Claims. (Cl. 200—61.25)

The present invention relates to certain new and useful improvements in a pneumatic tire deflation indicating signal, that is, a signalling device which comes automatically into play to indicate a dangerous tire condition and to warn the driver, perhaps in time, to take the necessary measures to minimize the likelihood of an accident and to thus safeguard himself and protect the vehicle against damage.

As is perhaps clear from the preceding statement of the nature of the invention, it is old in the art to provide warning signals either visual or audible in character. It is also well-known practice to use a red or an equivalent flash bulb and to mount the same on the instrument panel in the line of vision of the driver so that if and when the pressure in any one of the tires starts to approach an abnormal low the signalling lamp or bulb will come on, so to speak, provide the timely warning and give the driver, if possible, an opportunity to move out of the traffic lane and check the condition of his tires, all in a generally well-known manner.

The object of the present invention is to structurally functionally and otherwise improve upon similarly constructed and performing instrument panel warning signals and, in doing so, to provide and offer a simple, expedient and practical assemblage of component parts which provide a construction that ought to appeal to manufacturers and retailers, automobile or repair mechanics and the many different classes of drivers and users that have to be taken into account in evaluating and appraising inventions in this line of endeavor.

Keeping in mind the desire to achieve the desired and intended ends a construction has been evolved and produced which is believed to be expedient and practical, simple, efficient, reliable and capable of fulfilling the purposes for which it is intended for use. To this end the invention features, as one of its aspects, a simple circuit make and break device. This is characterized by a spring biased sliding contact member in an insulated cylinder wherein the spring means is adjustable as to sensitivity of response, the cylindrical portion being provided with a neck and a flanged head, the head being ported and the neck being swivelly connected with a coupling ring and said ring being adapted to adjoin the screw neck of a tire inflation valve in a manner that the head depresses the valve stem and utilizes the air from the chamber of the tire to control the circuit make and break means.

The invention also features an endless current collector and supply ring and a suitable channelled adapter therefor and a spring pressed plunger which serves to pick up the current and deliver it by way of a conductor to a signalling light on the vehicle instrument panel or elsewhere.

Other objects, features and advantages will become more readily apparent from the following description and the accompanying illustrative drawings.

In the drawings wherein like numerals are employed to designate like parts throughout the views:

Fig. 3 is a section on the line 3—3 of Fig. 1;

Fig. 4 is a detail section on the line 4—4 of Fig. 3;

Fig. 5 is a section on the line 5—5 of Fig. 1; and

Fig. 6 is a section on the line 6—6 of Fig. 5.

Figure 1:
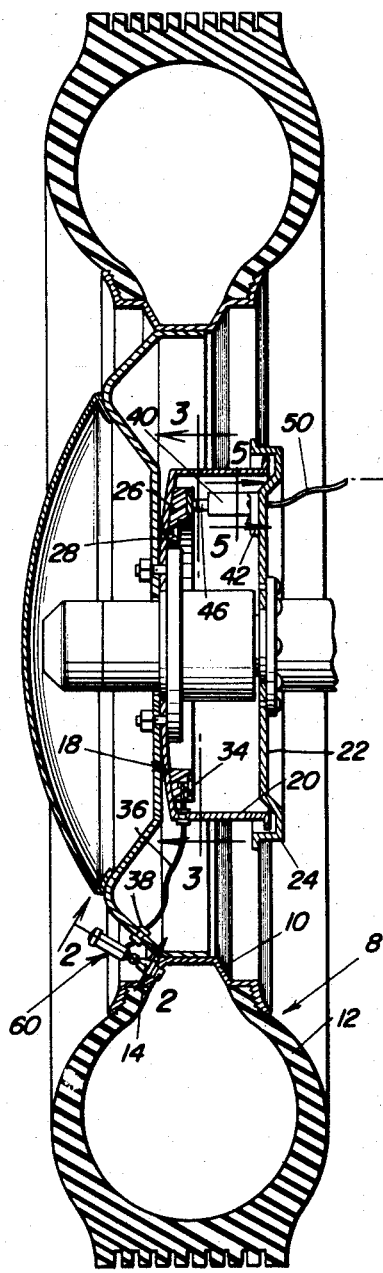
Fig. 1 is a view in section and elevation showing a tire equipped wheel having the present tire deflation signalling means embodied therein and readied for use.
Figure 2:
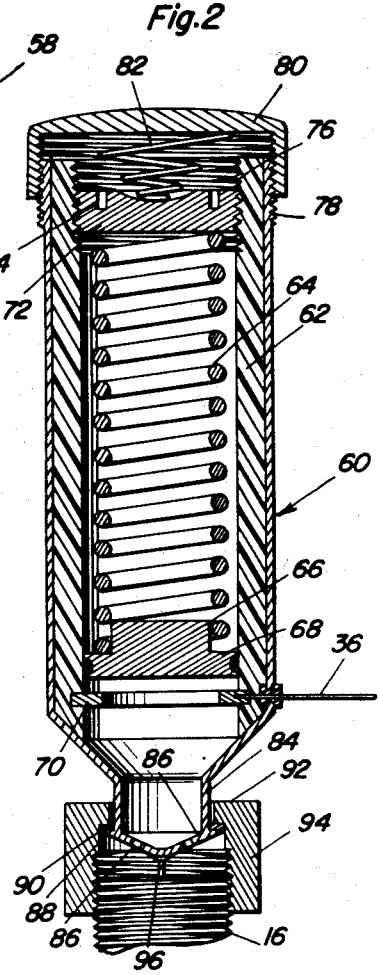
Fig. 2 is an exaggerated section, with parts in elevation, on the line 2—2 of Fig. 1 looking in the direction of the arrows.

Referring now to the drawing and particularly to Fig. 1 the vehicle is denoted generally by the numeral 8 and embodies a rim 10 equipped with a pneumatic tubeless tire 12, said rim, in turn, being provided with an inflation valve 14 the neck of which is denoted by the numeral 16 as shown in Fig. 2. Mounted on the hub portion of the wheel there is a cup-like member 18 the flanged rim of which is denoted at 20. There is a suitable cover 22 for this part and it too has a flanged rim 24 encompassing the adjacent flanged portion of the rim 20 and these parts go to make up an appropriate enclosure which houses the parts of the structure which are confined and protectively located therein. These parts are simple and one part 26 comprises an annulus of insulation material having an attaching flange 28. This part as perhaps best shown in Fig. 4 has a channel 30 therein in which an endless metal current conducting or collector ring 32 is fastened as at 34. There is a current conducting wire 36 connected with the fastener 34 and collector ring and thus passes down through a bushing or sleeve 38 in the body of the wheel and is electrically connected with a novel circuit make and break device of the type seen in Fig. 2. However, and before discussing this device attention is directed to the means for completing the circuit from the collector ring which comprises a socket member 40 having an attaching flange 42 suitably riveted or secured as at 44 to the cover member 22. A plunger of current conducting material 46 is slidable in the cylinder and through the open left hand end in Fig. 6 where it has constant wiping and current pick-up contact with the collector ring 32. A coil compression spring 48 is located in the socket member and serves to urge the plunger to its operating position as seen in Fig. 6. The conductor 50 leading therefrom is joined with the warning signal which as seen in Fig. 1 may comprise a red colored signalling lamp or bulb 52 (not detailed). This bulb is preferably mounted on the instrument panel (not shown) in any suitable manner and a circuit cut-in and cut-out switch is provided at 54, the battery being denoted at 56 and the ground at 58.

The circuit make and break attachment as seen in Fig. 2 comprises a cylindrical container 60 having a lining 62 of insulation material which lining encloses a coil spring 64 said spring having its lowermost coil (in Fig. 2) embracing the boss 66 on the snug fitting sliding contact button 68. This button is movable toward and from a complemental contact ring 70 suitably anchored in the insulation in line with the button. The upper end of the spring is pressed against a screw plug 72 with spanner wrench sockets 74, said plug being adjustable as at 76 in the bushing or lining and functioning to regulate the tension of the coil spring and consequently the responsive action of the circuit make and break button 66. The casing has an openable screwthreaded upper end 78 for the threaded flange of the screw cap 80. A coil spring 82 is mounted between the cap and spring tensioning and adjusting plug 72. The lower end of the cylinder has a reduced neck 84 terminating in a conical cap 86 with a marginal flange 88 and a packing ring 90 cooperating with the flanged portion 92 of the cap-like coupling 94. This ported or apertured head serves to depress the valve stem 96 so that air from the chamber of the tire may pass on into the cylinder or container to thus act on the circuit make and break elements 68 and 70 in an obvious manner. The aforementioned conductor 36 is of course connected with the fixed contact ring or element 70.

It is believed that the construction, mode of operation, and features and advantages of this invention will be readily apparent to the reader after having studied the specification in conjunction with the description of the details. An understanding will be further enhanced by considering the invention defined in the accompanying claims.

Minor changes in shape, size, material and rearrangement of components or parts may be resorted to in actual practice without departing from the spirit of the invention or the scope of the invention as claimed.

What is claimed as new is as follows:

1. An air pressure responsive circuit make and break device usable in conjunction with the screw-threaded neck of an inflation valve such as is employed on and in conjunction with a pneumatic tire comprising a cylindrical container provided at an upper end with a removable screw cap, provided at a lower end with a reduced neck terminating in a head, said head being conical in form and provided with air inlet ports, said head, at its point of juncture with said neck, having an outstanding marginal assembling and retaining flange provided with a gasket ring, and a flanged screw-threaded cap-like coupling embracing said neck and cooperable with the flange and ring in a manner to connect the head and neck with the neck portion of the aforementioned inflation valve, and pressure responsive means in said cylinder including circuit make and break elements controlled by the pressure entering the space of the cylinder by way of the ports in said head.

2. The structure defined in claim 1 and wherein said means comprises a ring of current conducting material, a sleeve of insulation fitted in and lining said cylinder, said ring being fixed in said sleeve and insulated thereby from said cylinder and having a current conductor connected therewith and adapted to be interposed in an electric circuit, a coil tension spring mounted in said lining, and a piston-like contact button slidable in said lining with one side engaged by said spring and its opposite side exposed to air pressure from air entering said ports whereby said button is slidable into and from engagement with said ring in response to spring and air pressure against opposite sides thereof to close and open a circuit in which said conductor is interposed.

References Cited in the file of this patent

UNITED STATES PATENTS

| | | |
|---|---|---|
| 1,890,376 | Gewecke et al. | Dec. 6, 1932 |
| 2,040,554 | Holmes | May 12, 1936 |
| 2,258,384 | Harrington | Oct. 7, 1941 |
| 2,752,786 | Trinca | July 3, 1956 |